J. H. JOHNSON.
LAVATORY FIXTURE.
APPLICATION FILED JULY 12, 1906.
1,000,735.
Patented Aug. 15, 1911.
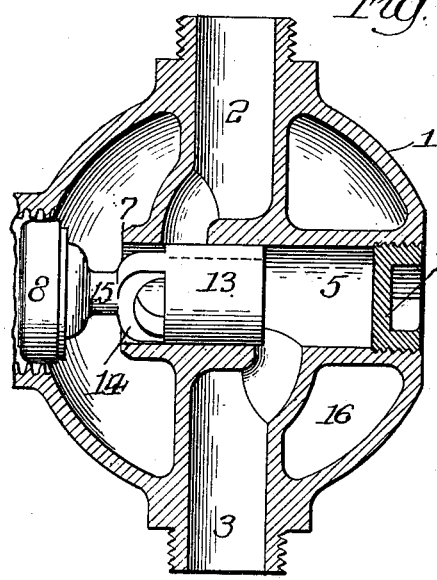
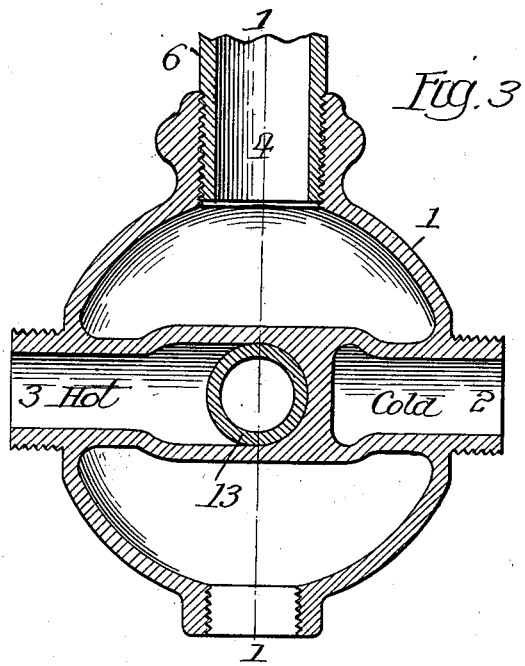
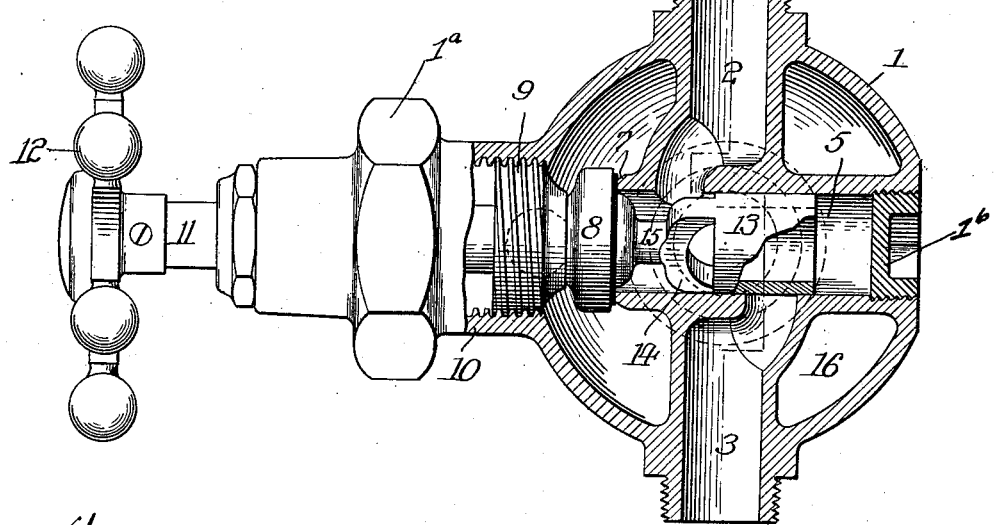
Witnesses:
Harold G. Bautt
Louis B. Erwin
Inventor:
John H. Johnson
by Rector Hibbens Davis
his Attys

UNITED STATES PATENT OFFICE.

JOHN H. JOHNSON, OF CHICAGO, ILLINOIS.

LAVATORY-FIXTURE.

1,000,735.

Specification of Letters Patent. Patented Aug. 15, 1911.

Application filed July 12, 1906. Serial No. 325,788.

*To all whom it may concern:*

Be it known that I, JOHN H. JOHNSON, a citizen of the United States, residing at Chicago, Cook county, Illinois, have invented certain new and useful Improvements in Lavatory-Fixtures, of which the following is a specification.

My invention relates to lavatory fixtures and the object thereof is to provide what may be conveniently termed an anti-scalding device, because of the fact that the fixture, which is designed to control the supply of hot and cold water either separately or mixed, is so constructed and arranged as to prevent the flow of hot water initially and not to permit it to flow until after the cold water has been turned on or admitted, with the result that it is impossible to scald a person using the device as often occurs when hot water is admitted at the initial opening of the valve.

My invention is particularly applicable to fixtures for controlling the hot and cold water for a shower bath or the like and obviously has advantages in such particular application, but it will be understood that my invention is not limited to such particular use but that it may be employed generally for the control of hot and cold water connections in any position or for any particular use.

In the drawings, Figure 1 is a view partly in section and partly in elevation of my lavatory fixture, the section being taken on the line 1—1 of Fig. 3; Fig. 2, a view similar to the sectional part of Fig. 1 but showing the valve in a different position; and Fig. 3 a section on the line 3—3 of Fig. 1.

Referring to the present embodiment of my invention and describing the same in connection with a fixture designed for use with a shower bath, the fixture comprises a valve casing 1 herein shown as globular in form and having the cold and hot water connections 2 and 3 respectively entering opposite sides and diametrical thereof and arranged to communicate with the outlet 4 when permitted by the valve as hereinafter described. The two connections 2 and 3 extend to and are arranged to communicate with a cylindrical chamber 5 arranged diametrically of the valve casing and in a horizontal plane when the particular fixture being described is in use, with the result that the outlet 4 will lead from the top of the valve casing, as indicated in Fig. 3, so as to connect with the usual pipe 6 extending to the shower bath. At the inner end of the cylindrical chamber 5 is formed a valve seat 7 on which is arranged to seat the main valve 8 of the fixture. Such valve being operatively connected in a suitable manner with a rotatable head 9 having external screw-threads adapted to engage corresponding screw threads in the bore of the extension or shank 10 of the globular valve casing. This rotatable head 9 is connected to the stem 11 extending extraneous of the valve casing and secured in suitable manner to the hand wheel 12. By rotation of this hand wheel the head 9 is rotated and the latter, by reason of its screw-threaded engagement with the shank 10, is moved longitudinally in one direction or the other as the case may be, with the result that the valve 8 will be moved away or toward its seat according to the direction or rotation of the hand wheel 12.

The valve 8 is connected with a hollow cylindrical valve 13 arranged to fit snugly within the chamber 5 and to control the communication thereto from the hot and cold water connections respectively. This valve 13 is formed at its outer end as a cylinder and is provided at its inner end with a yoke 14, which is connected with the main valve 8 by means of a stem 15, all as clearly illustrated in Fig. 1.

The construction and arrangement of the valves proper and the connections is such that, as hereinbefore suggested, the cold water is admitted to chamber 16 at the initial opening of the main valve and the hot water is not admitted until the main valve is further opened, so that scalding of a person is impossible. Referring more particularly to Figs. 1 and 2, Fig. 1 represents the normal or closed position of the valves and Fig. 2 represents the position of the valve when the main valve is opened to its full extent and admitting hot water exclusively and closing off the cold water connection. Referring to Fig. 1, the cold water entering the connection 2 is present against the inner side of the main valve 8 and is also present within the chamber 5, whereas the hot water in the connection is prevented from entering such chamber by the cylindrical valve 13 which at this time closes the communication between said connection and chamber. When, however, the hand wheel 12 is turned in a direction to lift the main valve 8 off its seat the cold water enters the interior or chamber 16 of the valve casing and finds exit through the passage pipe 6 leading to the shower bath in the present instance. Cold water will continue to be admitted alone until the right hand end (Fig. 1) of the cylindrical valve 13 opens the communication or connection 3 into the chamber 5, with the result that the hot water will also enter such chamber and passing through the interior of the valve 13 will mix and mingle with the cold water entering simultaneously through the cold water connection 2, and such mixed water will then flow past the main valve 8 and through the shower bath connections 4 and 6. The present construction is such that the cold water passage is open to its full extent just at or before the time when the cylindrical valve 13 opens the hot water connection 3, and further, the arrangement is such that continued opening movement of the main valve causes a diminishing of the flow of cold water and an increasing of the flow of hot water until the cylindrical valve 13 completely closes the cold water connection with the result that thereafter, as shown in Fig. 2, hot water alone will be supplied to the shower bath. Thus the construction and arrangement is such that it is impossible to supply the hot water initially, but only cold water and thereafter the mixed or tempered water may be admitted, and then the hot water alone, so that there is absolutely no danger of the scalding of a person.

In shutting off the valve the reverse operation takes place, the hot water connection being gradually closed and the cold water connection being gradually opened, after which the cold water connection is closed by the main valve.

My lavatory fixture is so constructed and arranged that the valve operating mechanism and associated parts may be removed bodily from one side of the casing, that is the side on which the hand wheel and operating stem are located. As shown clearly in Fig. 1 of the drawings, these parts are removable by first loosening the nut or cap piece 1ª and unscrewing the head piece 9, whereupon said parts, including the two valves, are removable directly through the opening in the extension 10 of the casing 1, the parts within the valve casing being of such a size and relation that they can be thus bodily removed from one side only of the valve casing. In the constructing of the valve casing the cylindrical chamber 5 is open when the casing is closed but the same is permanently closed in suitable manner, as by means of a screw plug 1ᵇ. In practice the side of the valve casing in which this plug is located is the one that is positioned toward the wall of the room or space in which this lavatory fixture is arranged, it being understood that this fixture is intended for a shower bath and that in practice such fixtures are located adjacent a wall. My construction and arrangement of the operating parts make it possible to easily remove the same for the purpose of repair and inspection of valve seats without disturbing the connections with the valve casing, which are intended to be more or less permanent and which are moreover difficult of removal, especially without marring or injuring the nickeled or polished parts.

I claim:

In a lavatory fixture a valve casing having a valve chamber substantially diametric thereof and hot and cold water connections substantially radial thereof and communicating with said valve chamber, said casing having a mixing chamber entirely surrounding the valve chamber and the water connections for the perfect mixing of the hot and cold water, a main valve controlling the communication between the valve chamber and the mixing chamber, a supplemental valve connected therewith and movable in unison with it, said supplemental valve being arranged to directly govern said hot and cold water connections, and a single means for operating both of said valves.

JOHN H. JOHNSON.

Witnesses:
LOUIS B. ERWIN,
ROBERT DOBBERMAN.

Copies of this patent may be obtained for five cents each, by addressing the "Commissioner of Patents, Washington, D. C."